United States Patent
Dörr et al.

(10) Patent No.: US 7,553,509 B2
(45) Date of Patent: Jun. 30, 2009

(54) ISOMALTULOSE-CONTAINING INSTANT BEVERAGE POWDER

(75) Inventors: Tillmann Dörr, Hohen-Sülzen (DE);
Lutz Guderjahn, Worms (DE); Thomas Keme, Aaran (CH); Anke Sentko, Bühlertal (DE); Jörg Kowalczyk, Eisenberg-Steinborn (DE)

(73) Assignee: Sudzucker Aktiengesellschaft, Mannheim/Ochsenfurt (DE)

(*) Notice: Subject to any disclaimer, the term of this patent is extended or adjusted under 35 U.S.C. 154(b) by 701 days.

(21) Appl. No.: 10/521,891

(22) PCT Filed: Jul. 19, 2003

(86) PCT No.: PCT/EP03/07902

§ 371 (c)(1),
(2), (4) Date: Apr. 18, 2005

(87) PCT Pub. No.: WO2004/008870

PCT Pub. Date: Jan. 29, 2004

(65) Prior Publication Data

US 2005/0202145 A1    Sep. 15, 2005

(30) Foreign Application Priority Data

Jul. 19, 2002 (DE) ............... 102 32 796

(51) Int. Cl.
*A23L 2/00* (2006.01)

(52) U.S. Cl. ............. 426/590; 426/597; 426/650; 426/658; 426/548

(58) Field of Classification Search ........... 426/590, 426/548, 650, 658, 592–599
See application file for complete search history.

(56) References Cited

U.S. PATENT DOCUMENTS

| 2,859,113 | A | * | 11/1958 | Goodfriend | 426/590 |
|---|---|---|---|---|---|
| 4,587,119 | A | * | 5/1986 | Bucke et al. | 424/48 |
| 4,732,773 | A | | 3/1988 | Schott | |
| 4,921,939 | A | * | 5/1990 | Nofre et al. | 558/414 |
| 5,013,576 | A | * | 5/1991 | Nakazawa et al. | 426/640 |
| 5,336,617 | A | * | 8/1994 | Sugitani et al. | 435/252.1 |

FOREIGN PATENT DOCUMENTS

| DE | 199 43 491 | 3/2001 |
|---|---|---|
| EP | 0 449 332 | 10/1991 |
| JP | 58 031961 | 2/1983 |
| JP | 58 138355 | 8/1983 |
| JP | 59-28457 | 2/1984 |
| JP | 62-503033 | 12/1987 |

(Continued)

OTHER PUBLICATIONS

English translation of Japanese Official Action dated Dec. 16, 2008 corresponding to Japanese Patent Application No. 2004-522523.

*Primary Examiner*—Anthony Weier
(74) *Attorney, Agent, or Firm*—Ostrolenk, Faber, Gerb & Soffen, LLP (57) ABSTRACT

The present invention relates to instant beverage powders, in particular aromatized or nonaromatized instant black tea powders, instant green tea powders, or instant Oolong tea powders, aromatized or nonaromatized instant herbal tea powders and instant fruit tea powders said powders containing ≧ 90% isomaltulose as a carrier and urea in reinforcing the sweetening power of isomaltulose.

34 Claims, 10 Drawing Sheets

FOREIGN PATENT DOCUMENTS

| | | |
|---|---|---|
| JP | 01 060360 | 3/1989 |
| JP | 58-031961 | 2/1993 |
| JP | 2000-041639 | 2/2000 |
| JP | 2000279086 | * 10/2000 |
| JP | 2002-501733 | 1/2002 |
| WO | WO 86/06625 | 11/1986 |
| WO | WO 99/38393 | 8/1999 |
| WO | WO 03/017788 | 3/2003 |

* cited by examiner

ISOMALTULOSE-CONTAINING INSTANT BEVERAGE POWDER

The present invention relates to instant beverage powders, in particular aromatized or nonaromatized instant black tea powders, instant green tea powders, or instant Oolong tea powders, aromatized or nonaromatized instant herbal tea powders and instant fruit teat powders.

Granulated beverages, for example granulated instant teas, very frequently comprise sucrose as carrier. However, it is proved that these products are burdened with great disadvantages. In numerous studies it has been found that the consumption of sucrose-containing instant teas can lead to considerable dental damage. For instance, Nursing Bottle Syndrome (NBS) which occurs in babies and infants, and is expressed by carious and periodontal damage to the milk teeth, pathological changes of the microbial spectrum of the oral cavity and chronic inflammation of the oral mucosa and of the alveolar jaw bone, is principally due to long-term sucking from pacifier bottles having sucrose-containing instant teas (see, for example, Behrendt et al., Monatsschr. Kinderheilk, 136 (1998), 30-33). In particular on account of the demonstrated damage to teeth and dentition due to sucrose-containing beverages, sucrose-free instant teas have been developed with carbohydrates, such as glucose or maltodextrins, as carriers. However, the consumption of maltodextrin-containing instant tea products also leads to an uncontrolled intake of cariogenic sugars (Koch and Wetzel, Schweiz. Monatsschr. Zahnmed., 105 (1995), 907-912).

Instant teas based on protein have also been developed. Although these instant teas are sugar-free, they likewise have a number of disadvantages. For example, it is not clear whether a constant supply of isolated proteins, especially between meals, can be considered desirable for health. Likewise, it is uncertain whether the supply of foreign proteins causes, for example, a risk of allergy for babies.

The instant teas known in the prior art, in particular based on maltodextrins and proteins, are therefore still capable of improvement with respect to their safety to health and their acariogenicity.

The naturally occurring reducing disaccharide ketose isomaltulose (6-O-α-D-glucopyranosylfructose; palatinose) has advantageous acariogenic properties, since isomaltulose is scarcely degraded by human oral flora. Isomaltulose is only cleaved with a delay by the glucosidases of the human small bowel wall, the resultant degradation products glucose and fructose being resorbed. This results in a slow increase in blood glucose, compared with rapidly digestible carbohydrates. Isomaltulose, unlike rapidly digestible high-glycemic foods, scarcely requires insulin for metabolism. Despite the favorable acariogenic properties, isomaltulose unlike other sugar replacers, such as mannitol, sorbitol and isomalt, or sweeteners such as cyclamate is scarcely used as sole sweetener in foods or beverages. This is associated, in particular, with the taste of isomaltulose, and in particular is due to considerably lower sweetening power compared with sucrose. The sweetening power of 10% strength aqueous isomaltulose solutions is only about 0.4 of the sweetening power of sugar. In addition there is the fact that isomaltulose can form reversion and Maillard products.

Isomaltulose (palatinose) is therefore chiefly used as starting material for preparing isomalt, a virtually equimolar mixture of the diastereomers 6-O-α-D-gluco-pyranosyl-D-sorbitol (1,6-GPS) and 1-O-α-D-glucopyranosyl-D-mannitol-(1, 1-GPM). As sweetener, isomaltulose, owing to its low sweetening power and the resultant taste, is chiefly used in combination with other sugar replacers and/or sweeteners in foods and/or beverages. Isomaltulose is also used to some extent to cover the unpleasant taste of other foods. On account of the delayed isomaltulose breakdown taking place first in the small bowel region, isomaltulose is also used in special foods or beverages for sportspeople to maintain oxidative metabolism.

The use of isomaltulose as sweetener in combination with other sugar replacers or sweeteners is described, for example, in WO 93/02566. WO 93/02566 describes chocolate products in which sugar is completely or partially replaced by products such as insulin and fructooligosaccharides. The chocolate composition can, in addition, comprise sugar replacers such as xylitol, isomalt and/or isomaltulose.

JP 1989-1174093 describes a sweetener mixture used for producing foods and bakery products which comprises, for example, isomaltulose or reduced isomaltulose in combination with fructose. The sweetener mixture can be used, for example, for producing milk products, chocolate, chewing gum etc.

JP 02234651 A2 describes producing anticariogenic foods and beverages, the sweetener used being a mixture of palatinose and palatinose-honey, a byproduct arising in palatinose production.

EP 390 438 B1 describes a sweetener mixture which comprises sucralose and isomaltulose, sucralose and isomaltulose showing synergistic effects. The sweetener mixture can be used, for example, for producing beverages and confectionery.

JP 01196258 A2 describes beverages which comprise caffeine-free tea/coffee, tryptophan and/or valerian and starch-hydrolysates-containing milk powder. As an example, a caffeine-free instant coffee is described which comprises tryptophan, aspartame and palatinose.

JP 62091162 A describes aspartame-containing foods and beverages which, if appropriate, can comprise palatinose.

The use of isomaltulose in foods and beverages for covering the unpleasant taste of certain food constituents is described, for example, in EP 0 809 939 A1. EP 0 809 939 A1 describes a yoghurt comprising lactic acid bacteria and bifido bacteria and comprising refined fish oil having a high proportion of unsaturated fatty acids and a sweetener, for example palatinose. The addition of palatinose is intended to prevent the development of the typical fish taste and fish odor.

JP 63152950 A2 describes the production of jellied vegetable products, using vegetables and gelling agent, palatinose and other additives such as cinnamon being used to cover the unpleasant odor of vegetable constituents.

The use of isomaltulose for maintaining oxidative metabolism is described, for example, in Japanese unexamined patent application Hei 11 (2000)-116754 which relates to foods and beverages for sportspeople that comprise palatinose as saccharide. Palatinose is used in particular in sports foods in order to maintain oxidative metabolism.

In summary it is shown that in the prior art there is a technical prejudice against the use of isomaltulose as sole sweetener and that isomaltulose, therefore, when used as sweetener, is chiefly used in combination with intensive sweeteners or other sugar replacers, but not as sole sweetener.

The technical problem underlying the present invention is thus to provide instant teas which overcome the disadvantages of the instant teas known in the prior art, that is to say that are harmless to health and, in particular, comprise no carbohydrates which can be fermented by oral flora, but which, nevertheless, have a pleasant sweet taste and which, on processing to form instant beverages, give products which can be granulated or pulverized and which are readily water-soluble and also pass into solution without residue even at relatively cold temperatures.

The present invention solves the technical problem underlying it by providing instant beverage powders comprising ≧90% by weight, based on the total amount, of isomaltulose as carrier, ≦5% by weight, based on the total amount, of water, and 0.1% by weight to 5% by weight, based on the total amount, of extract of plants and/or of plant parts. The present invention also solves the technical problem underlying it, in particular, by providing instant beverage powders which, in addition, comprise 0.1% by weight to 5% by weight, based on the total amount, of buffering additives, that is say urea and/or derivatives thereof, or salts of organic or inorganic acids.

According to the invention, it has surprisingly been observed that instant teas which comprise isomaltulose as sole sweetener and as sole carrier, after dissolution in water, surprisingly exhibit an extremely pleasant sweet taste without any need to add further sweetener or sugar replacer. The ready-to-drink teas or tea-like products produced using the inventive instant beverage powders, furthermore, advantageously do not lead to the known damage to teeth and dentition, since, in contrast to the instant tea beverages known in the prior art, they comprise no carbohydrates which can be fermented by oral flora. Furthermore, the buffering additives used inventively, such as ureas or salts, surprisingly lead to a reinforcement of the sweet isomaltulose taste. At the same time, they contribute to a considerable extent to the advantageous tooth-preserving properties of the inventive instant beverages, since, in the oral cavity, they can prevent any lowering of the pH below the critical value of 5.7. The use of isomaltulose as carrier also exhibits technological advantages, in particular in the production of the inventive instant beverage powders. Since isomaltulose is not hygroscopic, non-lump-forming free-flowing instant beverage powders can be produced without problem in powder or granule form. Owing to the good solubility of isomaltulose in water, the inventive instant beverage powders can be dissolved in water rapidly without residue even at cold temperatures and thus rapidly result in ready-to-drink teas or tea-like beverages. The use of isomaltulose as carrier is, furthermore, very inexpensive, since isomaltulose can be prepared economically from sucrose.

In the context of the present invention, "instant beverage powders" are taken to mean products which are rapidly soluble in water without residue, for the food and remedy sector and which are present in particular as powders, but also as granules. The instant beverage powders are produced, for example, by mixing one or more extracts of plant parts and/or plants with a pulverulent carrier, to give in particular pulverulent, but also granulated, free-flowing products.

According to the invention, therefore, the use of isomaltulose is contemplated as carrier of the inventive instant beverage powders. In the context of the present invention, a "carrier" is taken to mean a chemical substance which serves as substrate and/or framework for the substances which give rise to the typical taste-, odor- and color-giving properties of teas or tea-like products. The carrier, furthermore, serves as sweetener of the inventive instant beverage powders. "Isomaltulose" is a disaccharide ketose which occurs naturally, for example in honey. Isomaltulose is produced from pure sucrose solutions or sucrose solutions produced during sugar manufacture by transglucosidation of sucrose to form isomaltulose, using living or dead cells of Protaminobacter rubrum or enzyme extracts isolated therefrom. Isomaltulose crystallizes in the form of a monohydrate. The solubility of isomaltulose in water is 0.49 g of anhydrous isomaltulose per g of water.

An "extract" of plants and/or of plant parts is taken to mean a product produced by removing water from an aqueous plant extract. To produce tea extracts, that is to say extracts of plant parts of the tea shrub Camellia sinensis L. O. Kintze of the tea plant family processes such as ultrafiltration and reverse osmosis with subsequent spray-drying are used, for example. Freeze-concentration, which is customary in the production of coffee extract, cannot be used for producing tea extracts owing to the separation of polyphenol complexes. Tea extracts, or other plant extracts, have maximum water contents of 6%, and maximum ash contents of 20%.

In a preferred embodiment of the present invention, the inventive instant beverage powder is an instant tea powder. According to the invention, an "instant tea powder" is taken to mean a powder which comprises an extract produced in accordance with customary methods from plant parts, in particular leaves, leaf buds and tender stems of the tea shrub Camellia sinensis L. O. Kuntze of the tea plant family (Theaceae) and which is used to produce a ready-to-drink tea.

In a preferred embodiment of the invention, the inventive instant tea powder comprises an extract of black tea. "Black tea" is taken to mean fermented tea, the leaves of which are processed in accordance with the methods which are customary for producing black tea, such as withering, rolling, fermenting, comminution and drying. The present invention thus provides an instant black tea powder.

In a further preferred embodiment of the invention, it is contemplated that the inventive instant tea powder comprises an extract of Oolong tea. In the context of the present invention, "Oolong tea" is taken to mean a semi-fermented tea, the leaves of which are fermented by the customary methods such as withering and rolling, the fermentation being terminated after expiry of about half of the customary time, followed by drying. The present invention thus also provides an instant Oolong tea powder.

A further preferred embodiment of the invention relates to an instant tea powder which comprises an extract of green tea. "Green tea" is taken to mean an unfermented tea, the leaves of which are blanched, rolled and dried, and the natural leaf pigment of which is therefore substantially retained. The present invention thus also provides an instant green tea powder.

According to the invention, aromatized instant tea powders, in particular aromatized instant green tea powders, aromatized instant black tea powders and aromatized instant Oolong tea powders are also provided.

In a preferred embodiment of the invention, it is contemplated that the inventive instant tea powders, for aromatization, additionally comprise natural or nature-identical aroma substances and/or taste substances. "Aroma substances or taste substances" are taken to mean according to the invention aromas, i.e. substances or mixtures of substances which are intended to impart a particular aroma or taste to foods or beverages, in particular tea powders. "Natural" aromatizing odor substances and taste substances are substances or mixtures of substances which are isolated from natural sources, for example from plants or from plant parts, for example from fruits or seeds, and are if appropriate purified, in which case, if the natural sources are plants or plant parts, these are not from the tea shrub Camellia sinensis L. O. Kuntze. Obviously, the aroma substances and/or taste substances used for aromatizing can also have been made synthetically, that is to say, synthetically produced nature-identical aroma substances and/or taste substances can also be used for aromatization.

It is therefore contemplated according to the invention that the inventive instant tea powders are additionally admixed with aromatizing aroma substances and/or taste substances. According to the invention, it is possible, for example, to admix the produced instant tea powder itself, that is the mixture comprising the carrier and a tea extract, with the aromatizing natural or nature-identical aroma substances and/or taste substances. According to the invention, however, there is also the possibility of first adding the aromatizing aroma substances and/or taste substances to the tea extract and then using the tea extract thus aromatized for producing the inventive aromatized instant tea powders.

In a further embodiment of the invention, it is contemplated that the inventive instant tea powders are aromatized by using a tea extract for producing the instant tea powders, which tea extract has been isolated from a tea to which, for aromatization, flavoring fruit juices, aroma-giving and/or taste-giving plants or plant parts, or flavoring potable spirits, for example whisky, arrack or rum, have been added.

In a further preferred embodiment of the present invention, the inventive instant beverage powders are instant herbal tea powders. In the context of the present invention, an "instant herbal tea powder" is taken to mean a powder which comprises an extract isolated in accordance with customary methods, from plants which are not representatives of the tea plant family (Theaceae), and/or from plant parts thereof, in particular leaves, leaf buds, stems, blossoms, seeds or roots, and which is used for producing a ready-to-drink, tea-like beverage.

The inventive instant herbal tea powders preferably comprise an extract of aniseed, valerian root, stinging nettles, blackberry leaves, strawberry leaves, fennel, lady's mantel, silver weed, ginseng, rosehip, bilberry leaves, hibiscus blossoms, raspberry leaves, elder, hops, ginger, blackcurrant leaves, St. John's wort, chamomile, coriander, spearmint, Lapacho plant, lavender, lemon grass, linden blossoms, dandelion, marjoram, mallow, field eryngo, mate plant, lemon balm, mistletoe, peppermint, peony, marigold, rosemary, Rooibos, yarrow, plantain, thyme, verbena, hawthorn, hyssop, cinnamon and/or from parts thereof. It is contemplated according to the invention that the instant herbal tea powders can comprise extracts of a single plant species. The inventive instant herbal tea powders can therefore be, for example, instant peppermint tea powder, instant rosehip tea powder, instant fennel tea powder, instant St. John's wort tea powder, or instant chamomile tea powder, that is say tea powders which are used for preparing ready-to-drink peppermint tea, ready-to-drink rosehip tea, ready-to-drink fennel tea, ready-to-drink St. John's wort tea or ready-to-drink chamomile tea. According to the invention, however, there is also the possibility that the instant herbal tea powders can comprise extracts from at least two plant species.

A further preferred embodiment of the invention relates to aromatized instant herbal tea powders. In a preferred embodiment, the aromatized instant herbal tea powder additionally comprises, in addition to the appropriate plant extract, natural or nature-identical aroma substances or taste substances. In a further preferred embodiment of the invention, the aromatized instant herbal tea powder comprises an extract which has been isolated from plants or from plant parts to which have been added, before the extraction, flavoring fruit juices, for example, for aromatization.

In a further preferred embodiment of the invention, the inventive instant beverage powders are instant fruit tea powders. In the context of the present invention, an "instant fruit tea powder" is taken to mean a powder which comprises an extract of fruits and/or natural or nature-identical fruit flavors which is isolated in accordance with customary methods and which is used for producing a tea-like beverage with fruit taste. In a preferred embodiment, the inventive instant fruit tea powder comprises an extract of fruits such as apples, pineapples, pears, oranges, grapefruit, limes, passion fruits, peaches, sea buckthorn berries, lemons etc.

A further preferred embodiment of the invention relates to instant fruit tea powders comprising $\geqq 90\%$ by weight, based on the total amount, of isomaltulose as carrier, $\leqq 5\%$ by weight, based on the total amount, of water, and 0.1% by weight to 5% by weight, based on the total amount, of natural or nature-identical fruit flavors. That is to say the present invention relates to an instant fruit tea powder which is produced solely on the basis of, in particular, synthetically prepared fruit flavors, but without a fruit extract.

In further preferred embodiments of the invention, it is contemplated that inventive instant beverage powders comprise buffering additives. In the context of the present invention, "buffering additives" are taken to mean, in particular, compounds which on consumption of the tea beverages or tea-like beverages produced using the inventive instant beverage powders prevent, in particular in the oral cavity, a lowering of the pH to the acid range, a pH of at least 5.7 preferably being maintained. Advantageously, the inventive buffering additives therefore contribute to a considerable extent to the advantageous tooth-preserving properties of the inventive instant beverages. The inventively used buffering additives furthermore reinforce the pleasant sweet taste of the inventively used carrier medium isomaltulose.

In a preferred embodiment of the invention, urea and/or urea derivatives are used as buffering additives, the instant beverage powders comprising 0.1% by weight to 5% by weight of urea or a derivative thereof. The urea-containing instant beverage powders are distinguished by a particularly sweet taste, that is to say urea or the urea derivatives reinforce the sweetening power of the palatinose in an advantageous manner.

According to the invention, it is likewise contemplated that the instant beverage powders can also comprise 0.1% by weight to 5% by weight of salts of organic or inorganic acids as buffering additives. Preferably, salts such as trisodium citrate or a phosphate such as $K_2HPO_4$ or $KH_2PO_4$ are used.

According to the invention, it is likewise contemplated that the inventive instant beverage powders comprise flow promoters. A "flow promoter" or "flow agent" is taken to mean what are termed free-flow aids which, for example bring about free flow of sticky or blocking powders. Preferably, the inventively used flow promoter is silicon dioxide.

According to the invention, it is likewise contemplated that the instant beverage powders can, in addition, comprises natural and/or synthetic colorings. The natural colorings can be, for example, colorings of plant origin, such as carotenoids, flavonoids and anthocyans, colorings of animal origin such as cochineal, inorganic pigments such as titanium dioxide, iron oxide pigments and iron hydroxide pigments. As natural colorings, use can likewise be made of secondarily formed colorings such as the products of enzymatic browning, for example polyphenols and products of non-enzymatic browning such as melanoidins. According to the invention, it is further contemplated that, as natural colorings, heating products, for example caramel, can be used. For the inventive instant beverage powders, furthermore, synthetic colorings such as azo compounds, triphenylmethane compounds, indigoid compounds, xanthene compounds and quinoline compounds can be used. Preferably, the inventively used synthetic colorings are water-soluble to a particular extent.

According to the invention, the inventive instant beverage powders can additionally be enriched with natural or synthetic vitamins selected from the group consisting of vitamin A, vitamin $B_1$, vitamin $B_2$, vitamin $B_3$, vitamin $B_5$, vitamin $B_6$, vitamin $B_{12}$, vitamin B complex, vitamin C, vitamin D, vitamin E, vitamin F and vitamin K. The inventive instant beverage powders can, in addition, comprise additional minerals and trace elements. According to the invention, it is likewise contemplated that the instant beverage powders also comprise intense sweeteners such as saccharin, saccharin Na, saccharin K, saccharin Ca, sodium cyclamate, calcium cyclamate, acesulfame K, aspartame, dulcine, stevioside and neohesperidine dihydrochalcone.

The tea beverages, or tea-like beverages such as herbal tea or fruit tea which are manufactured on the basis of the inventive instant beverage powders are advantageously distinguished in that, in contrast to the carbohydrate-containing instant tea beverages known from the prior art, on consumption, they do not lead, or lead at most for a short time, to a pH lowering in the oral cavity to the range below 5.7 which is of importance for tooth damage, as determined by means of methods of plaque pH telemetry. Intraoral plaque pH telemetry (Graf and Muhlemann, J. Dent. Res. 44 (1965), 1039; Graf and Muhlemann, Helv. Odont. Acta, 10 (1966), 94) is the sole in-vivo method permitting rapid and reliable measurement of the $H^+$ ion concentration under undisturbed plaque at the level of the tooth enamel surface. The method therefore permits the pH and its change to be followed continuously in plaque-coated interdental space and in the oral fluid during and after undisturbed intake of beverages or foods. The inventive instant beverage powders based on isomaltulose as carrier are, on the basis of the pH telemetry determinations performed, classified as tooth-preserving, or in the sector of tooth-preserving products, that is to say as tooth-friendly. The tooth-preserving properties according to the invention are reinforced, according to the invention, by the addition of urea or salts of organic or inorganic acids.

Finally, the present invention relates to the use of isomaltulose as, in particular, tooth-preserving or acariogenic component, in particular as sweetener, in teas, in particular instant teas, and/or in instant beverage powder.

The invention will be described in more detail on the basis of the figures and examples hereinafter.

FIGS. 1 to 8 show pHs measured by telemetry of various old interdental plaques in subjects during and 30 min after rinsing with 15 ml of the tested inventive instant teas and also during and 30 min after rinsing with 15 ml of a 0.3 mol/l (10%) sucrose solution. (PC)=paraffin chewing, (id)=age of the interdental plaque in days.

EXAMPLE 1

Formulations of Isomaltulose Tea 1.1 Fruit Tea

| | |
|---|---|
| 90.0% | isomaltulose |
| 8.0% | flavors (e.g. mango-maracuja, raspberry, blackcurrant, bilberry) |
| 1.0% | malic acid |
| 0.5% | black tea extract (e.g. decaffeinated) |
| 0.5% | *hibiscus* blossom extract |

1.2 Fruit Tea with Urea

| | |
|---|---|
| 90.0% | isomaltulose |
| 8.0% | flavors (e.g. mango-maracuja, raspberry, blackcurrant, bilberry) |
| 1.0% | malic acid |
| 0.5% | black tea extract (e.g. decaffeinated) |
| 0.5% | *hibiscus* blossom extract |
| 0.1% | urea |

1.3 Fennel Tea

| | |
|---|---|
| 93.0% | isomaltulose |
| 7.0% | fennel extract |

1.4 Fennel Tea with Urea

| | |
|---|---|
| 93.0% | isomaltulose |
| 7.0% | fennel extract |
| 0.1% | urea |

1.5 Fennel Tea with Sodium Citrate

| | |
|---|---|
| 93.0% | isomaltulose |
| 7.0% | fennel extract |
| 0.5% | sodium citrate |

1.6 Herbal Tea

| | |
|---|---|
| 96.0% | isomaltulose |
| 4.0% | herbal mixture |

1.7 Green Tea

| | |
|---|---|
| 92.0% | isomaltulose |
| 8.0% | green tea extract |

1.8 Green Tea with Urea

| | |
|---|---|
| 92.0% | isomaltulose |
| 8.0% | green tea extract |
| 0.02% | urea |

1.9 Lemon Tea

| | |
|---|---|
| 95.5% | isomaltulose |
| 1.0% | black tea extract (e.g. decaffeinated) |
| 1.5% | citric acid |
| 1.0% | flavor + juice powder |
| 1.0% | vitamin C |

EXAMPLE 2

Effect of Inventive Instant Beverage Powders on the pH in the Oral Cavity

Using methods of plaque pH telemetry, the effect of inventive instant beverage powders on the pH in the oral cavity was determined in patients having a removable dental prosthesis. The method permits any acid neutralization due to the oral fluid and alkalizing product additives to be followed during the pH determination. The telemetric measurements therefore serve to clarify whether, in particular, ready-to-use products can be fermented in the oral flora and whether, therefore, during or after consumption thereof, a critical acidification of the plaque below a pH of 5.7 occurs. If this is not the case, the tested products can be considered to be tooth-preserving or tooth-friendly. If dietary acids lower the pH during consumption of a test product below 5.7, evaluation in $\mu$mol $H^+ \times$min/l is carried out to test possible erosive damage to the hard tooth structure. If the critical value of 40 $\mu$mol $H^+ \times$min/l is not exceeded during consumption, the possibility production of dental erosion can be excluded. If this value is exceeded, the product, despite the replacement of fermentable sugar by sugar replacers, cannot be considered as tooth-preserving because of the risk of triggering erosion of the tooth enamel.

The studies were carried out on four patients. All subjects had a lower jaw telemetric prosthesis each having a miniature pH glass electrode built into an interproximal space. The test prostheses were cleaned before insertion and the subjects were instructed to maintain their usual eating habits during the test period, but to abstain from any oral hygiene. The lack of removal of the prostheses permitted undisturbed plaque growth on the membrane surfaces of the electrodes installed interdentally. The pH tests were performed in accordance with the method described by Imfeld (Imfeld, in: Proceedings of a workshop on saliva-dental plaque and enamel surface interactions (editors Frank and Leach), (1982), 143-156, IRL Press Ltd. London).

In particular, the following were tested: inventive instant fennel teas without buffering additives, instant fennel teas with urea additive, instant fennel teas with trisodium citrate dihydrate additive and instant green tea without buffering additives. The tea samples were prepared as follows: in each case 1.5 g of instant beverage powder were stirred into 15 ml of warm water and stored in a refrigerator at 15° C. until consumption. Tea samples with trisodium citrate dihydrate additive were produced by mixing 1.5 g of powder and 6 mg of trisodium citrate dihydrate in 15 ml of water.

The effect of the prepared tea samples on the pH in the oral cavity was determined in accordance with test pattern A or in accordance with test pattern B.

Test pattern A comprised 3-minute chewing of paraffin, a 4-minute rest pause, a 15-minute control period for establishing the baseline, a 2-minute rinse with 15 ml of an inventive tea beverage, a 30-minute control period, 2-minute rinse with water, 3-minute chewing of paraffin, a 4-minute rest period, a 2-minute rinse with 15 ml of a 0.3 mol/l sucrose solution, a 30-minute control period, a 2-minute rinse with water, 3-minute chewing of paraffin and a 4-minute rest period. The results are shown in FIGS. 1 to 8.

Figure 1:
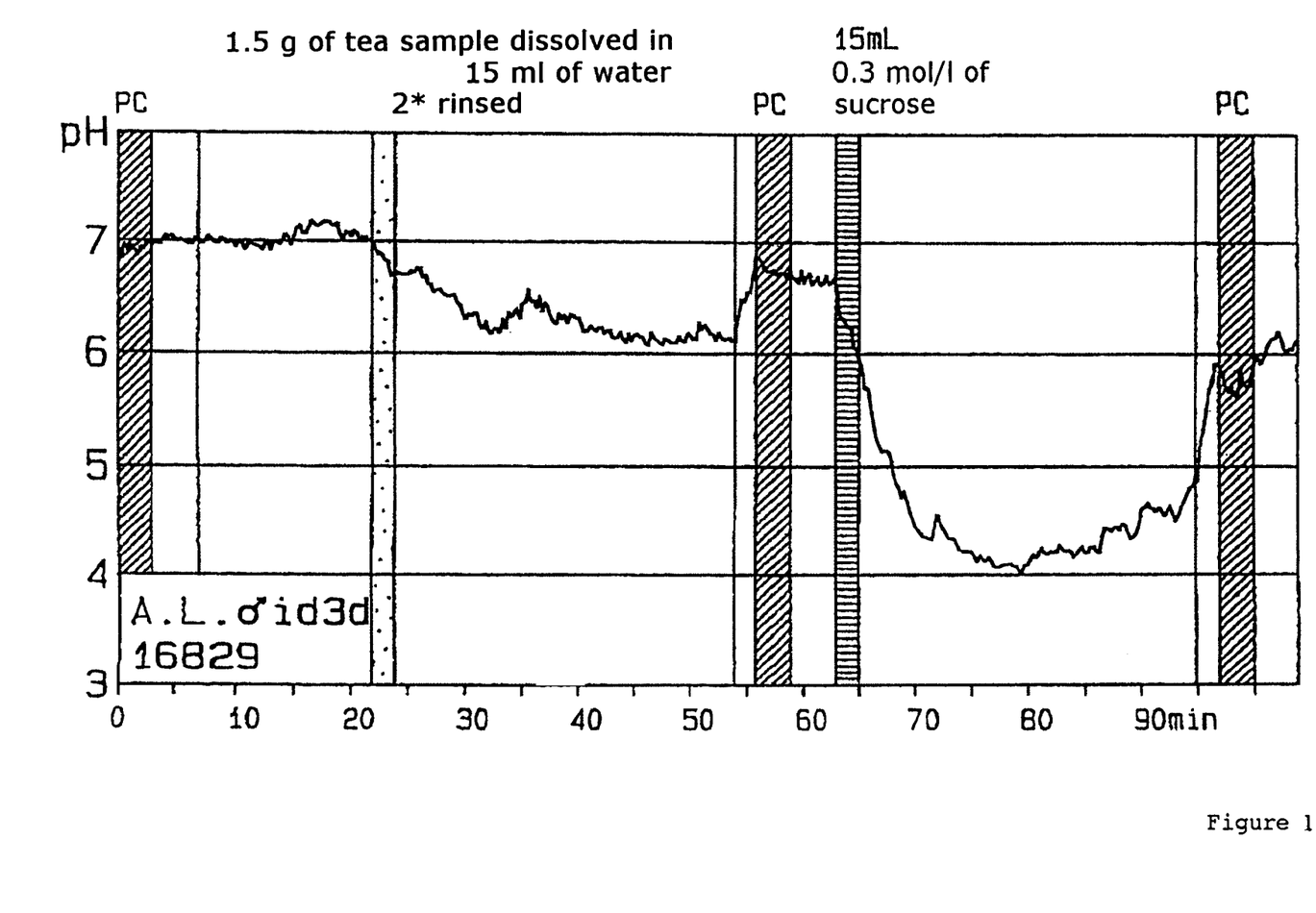
FIG. 1 shows the effect of an inventive instant fennel tea without addition of urea on the pH in the oral cavity of a subject.
Figure 2:
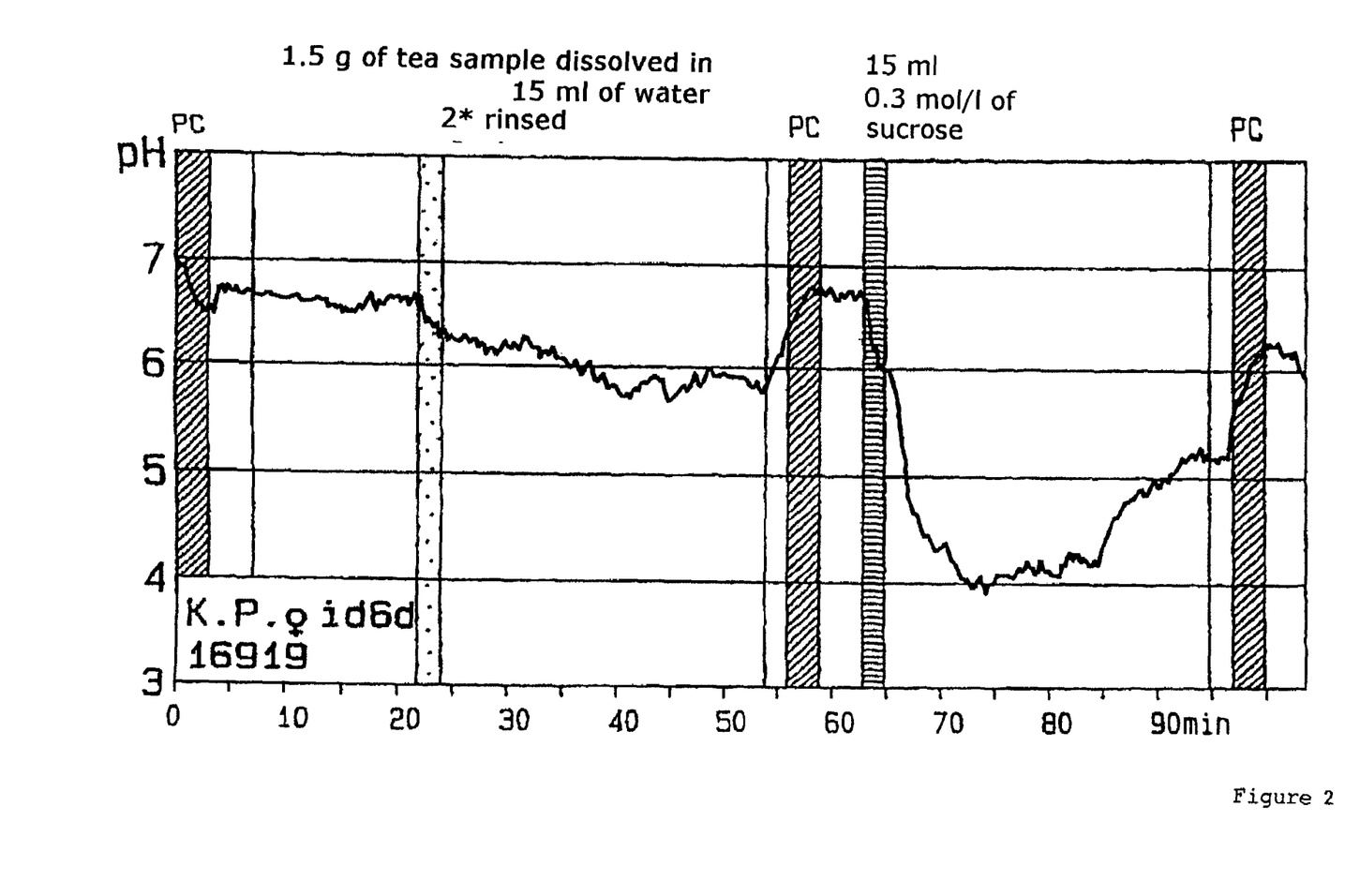
FIG. 2 shows the effect of an inventive instant fennel tea without addition of urea on the pH in the oral cavity of a subject.
Figure 3:
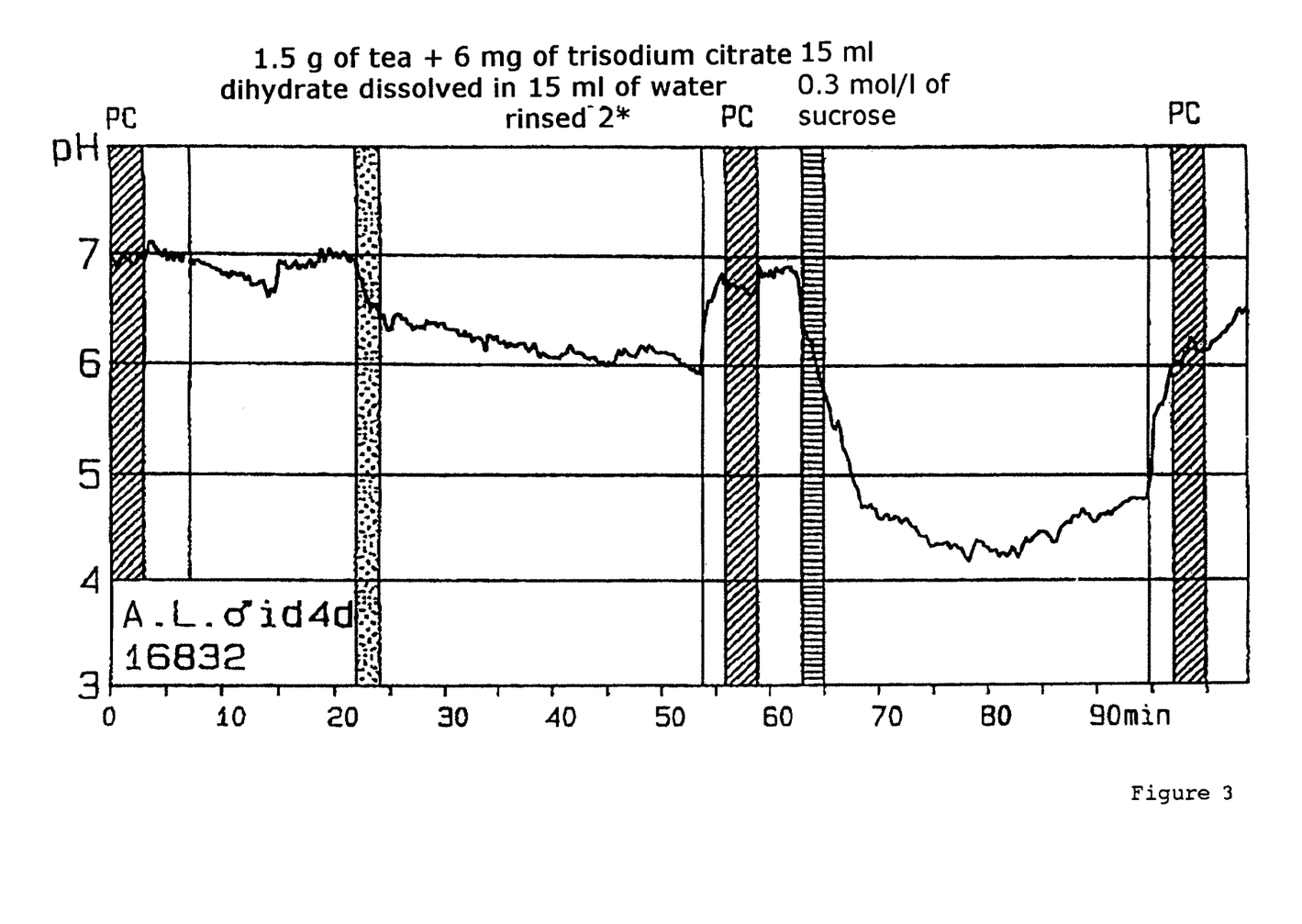
FIG. 3 shows the effect of an inventive instant fennel tea with citrate as buffering additive on the pH in the oral cavity of a subject.
Figure 4:
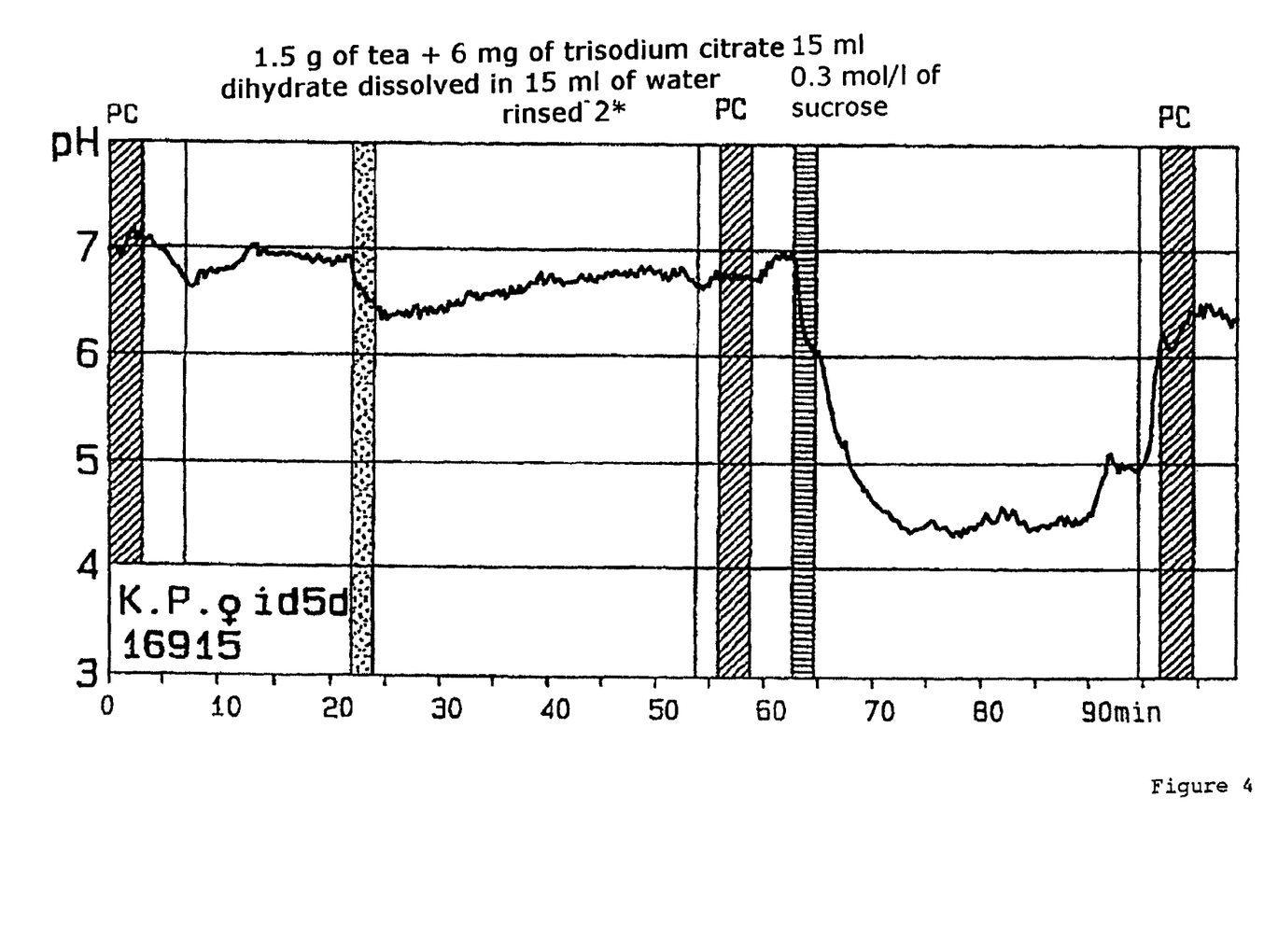
FIG. 4 shows the effect of an inventive instant fennel tea with citrate as buffering additive on the pH in the oral cavity of a subject.
Figure 5:
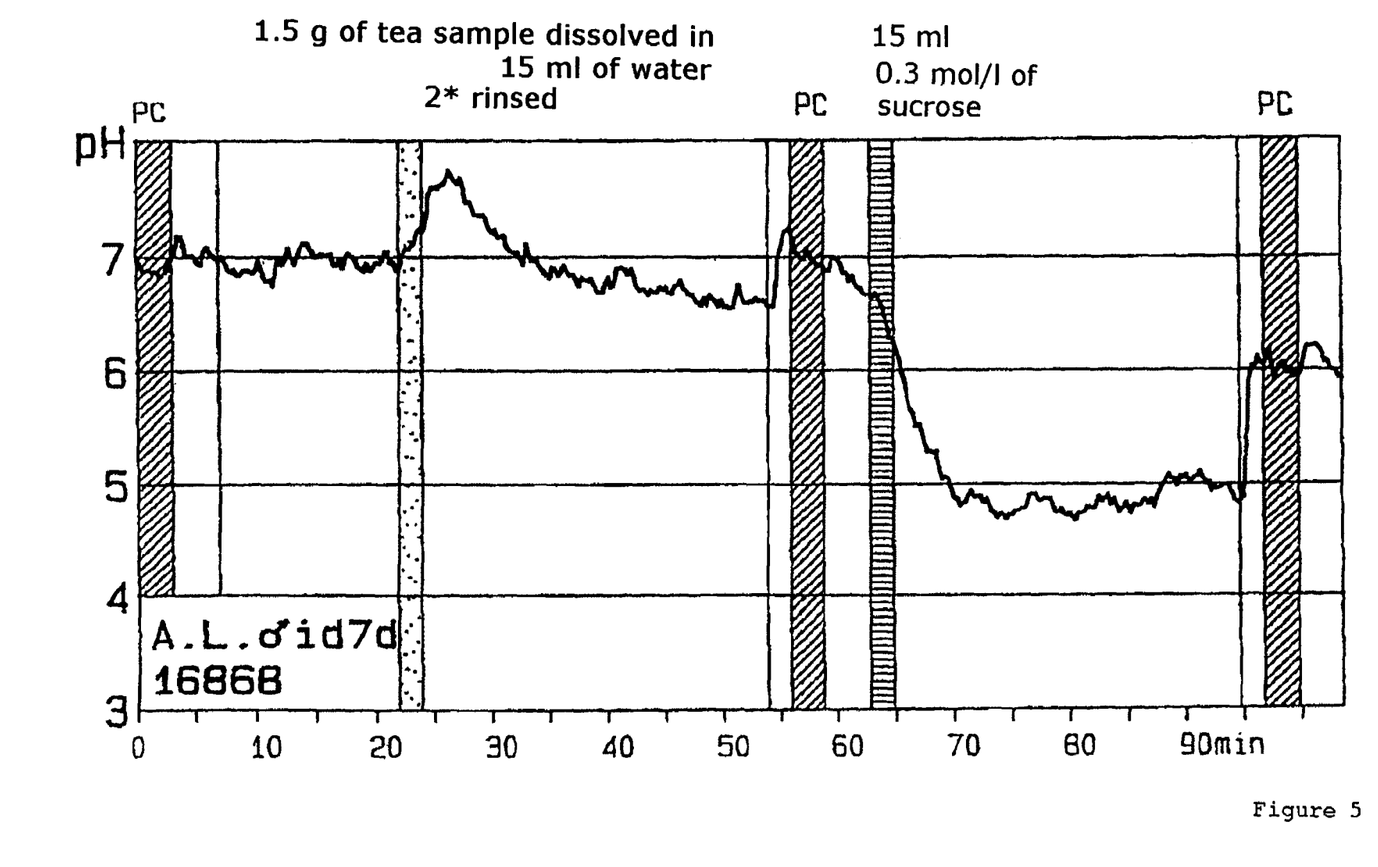
FIG. 5 shows the effect of an inventive instant fennel tea with urea additive on the pH in the oral cavity of a subject.
Figure 6:
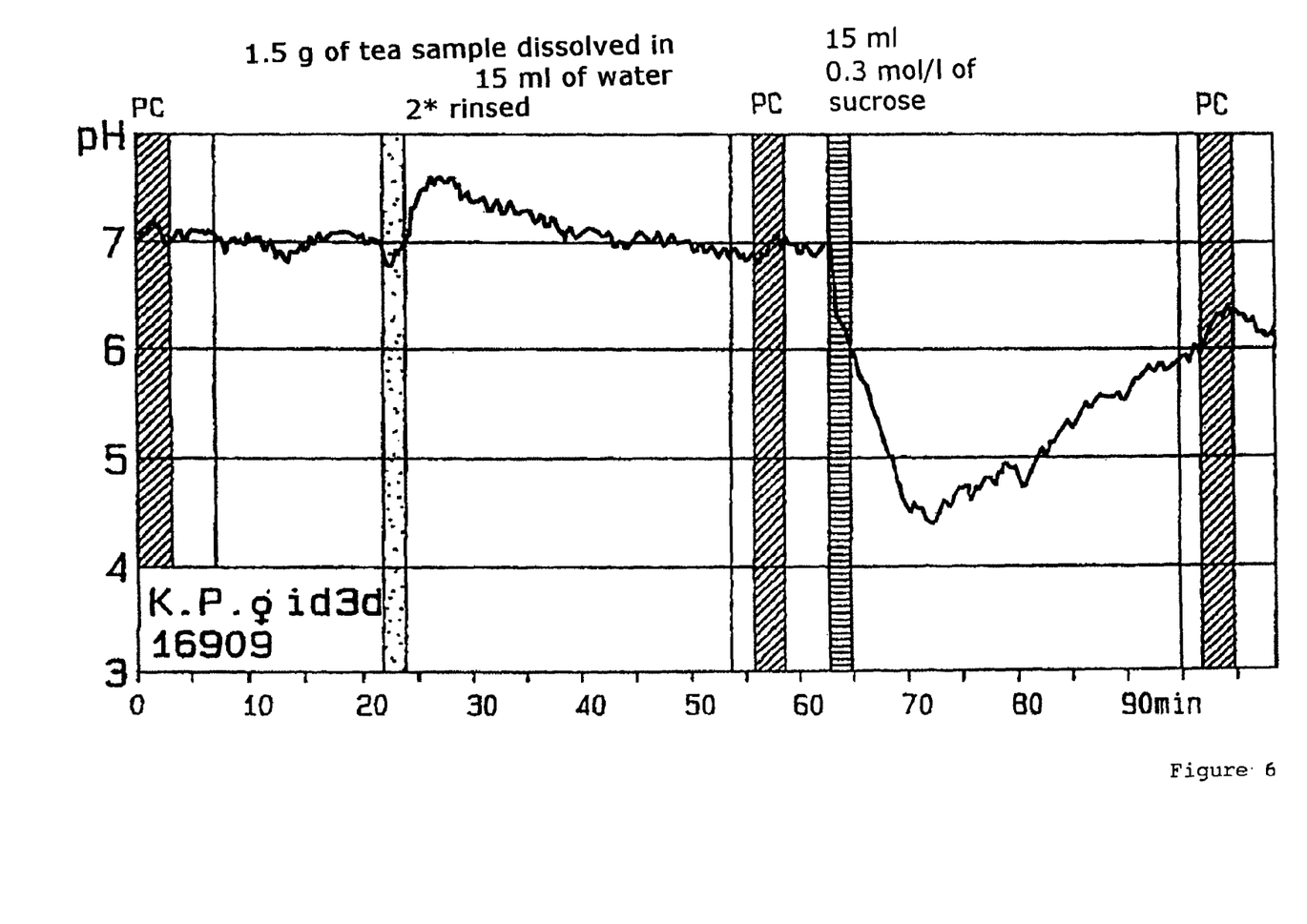
FIG. 6 shows the effect of an inventive instant fennel tea with urea additive on the pH in the oral cavity of a subject.
Figure 7:
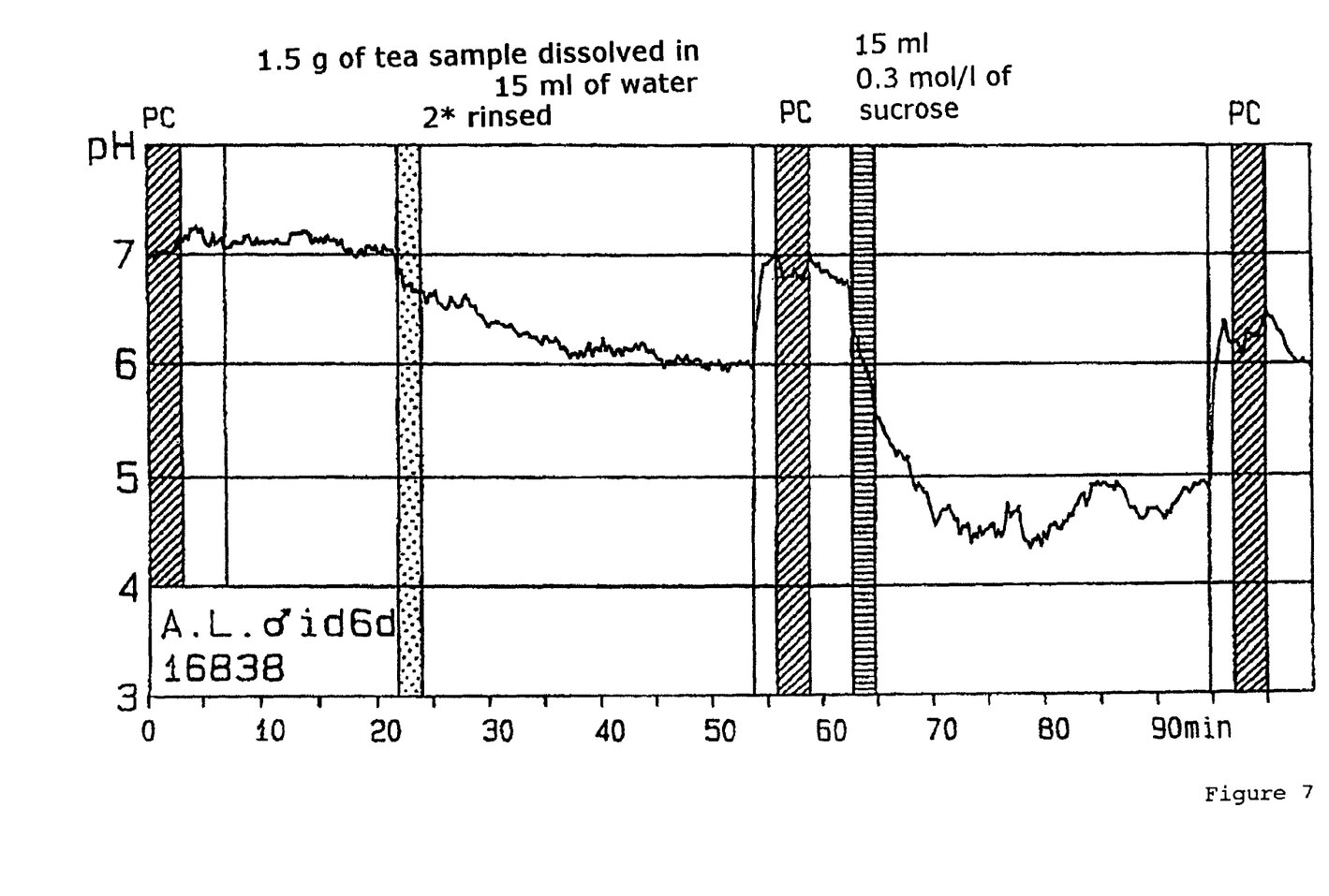
FIG. 7 shows the effect of an inventive instant green tea without buffering additives on the pH in the oral cavity of a subject.
Figure 8:
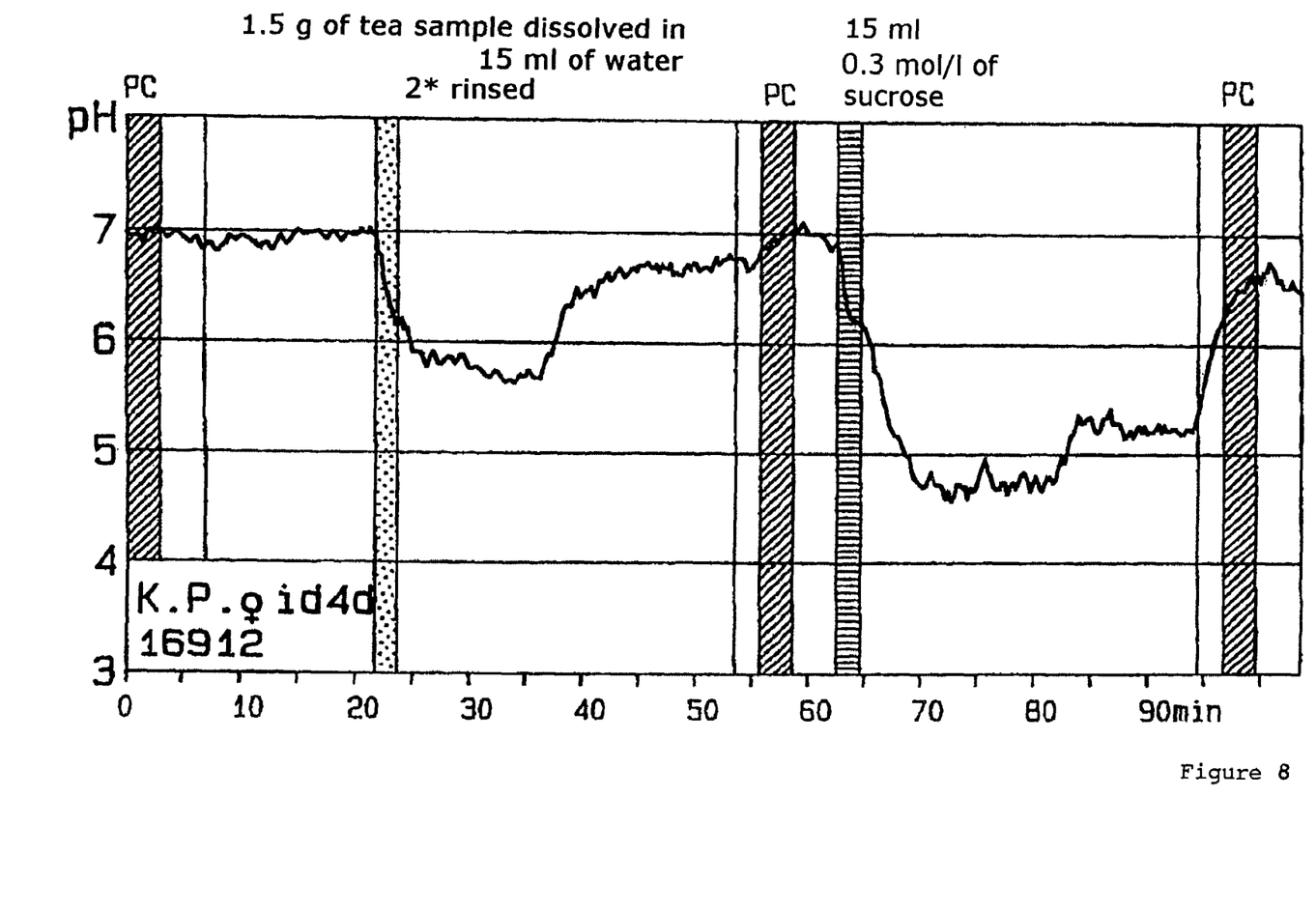
FIG. 8 shows the effect of an inventive instant green tea without buffering additives on the pH in the oral cavity of a subject.
Figure 9:
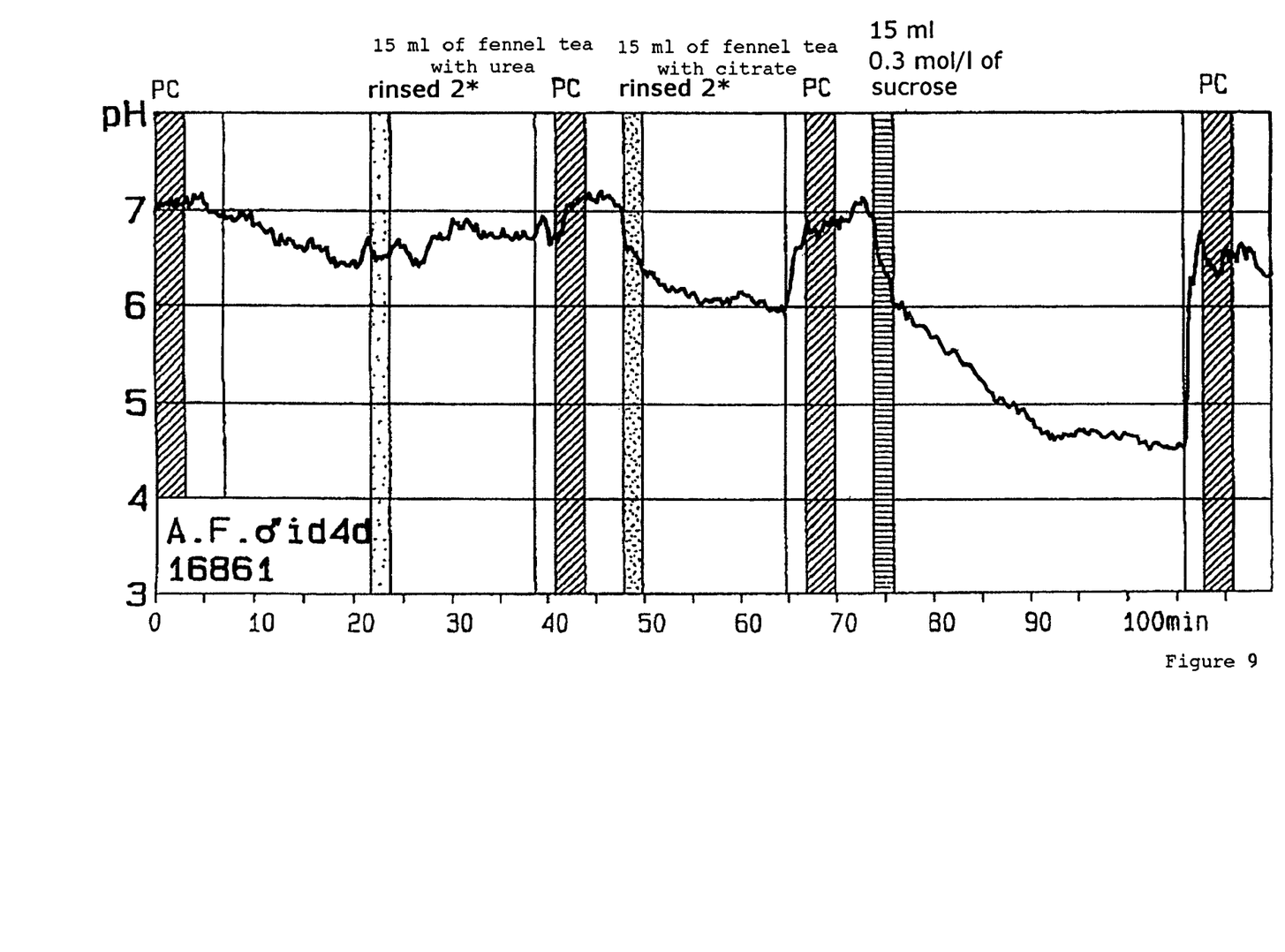
FIG. 9 shows the pHs measured by telemetry of various old interdental plaques of a subject during and 15 min after rinsing with an inventive instant fennel tea with urea additive, during and 15 min after rinsing with an inventive instant fennel tea with trisodium citrate dihydrate additive and during and 30 min after rinsing with 15 ml of a 0.3 mol/l (10%) sucrose solution. (PC)=paraffin chewing, (id)=age of the interdental plaque in days.
Figure 10:
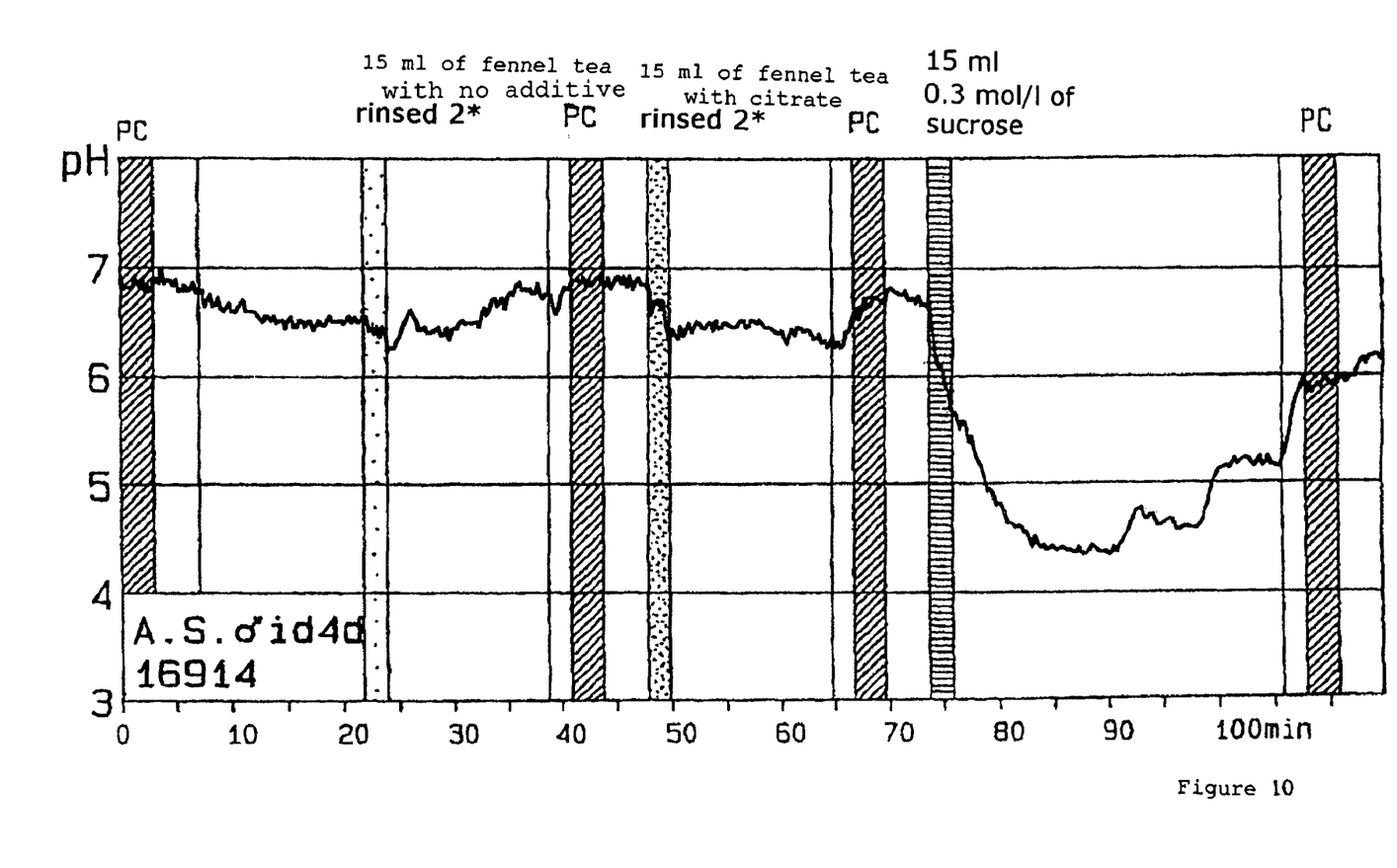
FIG. 10 shows the pHs measured by telemetry of various old interdental plaques of a subject during and 15 min after rinsing with an inventive instant fennel tea without buffering additives, during and 15 min after rinsing with an inventive instant fennel tea with trisodium citrate dihydrate additive, and also during and 30 min after rinsing with 15 ml of a 0.3 mol/l (10%) sucrose solution. (PC)=paraffin chewing, (id)=age of the inter-dental plaque in days.

Test pattern B comprised 3-minute chewing of paraffin, a 4-minute rest pause, a 15-minute control period for establishing the baseline, a 2-minute rinse with 15 ml of a first inventive tea beverage, a 15-minute control period, a 2-minute rinse with water, 3-minute chewing of paraffin, a 4-minute rest period, a 2-minute rinse with 15 ml of a second inventive tea beverage, a 15-minute control period, a 2-minute rinse with water, 3-minute chewing of paraffin, a 4-minute rest period, a 2-minute rinse with 15 ml of a 0.3 mol/l sucrose solution, a 30-minute control period, a 2-minute rinse with water, 3-minute chewing of paraffin and a 4-minute rest period. The results are shown in FIGS. 9 and 10.

The effect of the various inventive instant teas tested on the pH of the interdental plaque is shown in Table 1. The pHs obtained after chewing paraffin agreed with the pHs determined in earlier studies of the same subjects with the same plaque age and indicate specific physiological oral conditions of the subjects. The lowering of the pH after rinsing with 0.3 mol/l of sucrose solution serves as a positive control and demonstrates the correct functioning of the measurement system and of plaque metabolism. The studies show that during and after rinsing with the respective inventive tea beverages, different levels of acidification of the interdental spaces and of the plaque occur. After the consumption of sugar, the fermentation acids formed in the plaque undershoot the critical pH threshold of 5.7 considerably and lastingly.

The inventive instant fennel tea beverage without additive is at the borderline in the sector of tooth-preserving products. The inventive fennel tea with urea additive is graded as tooth-preserving. That is to say, the addition of urea produces neutralization of the fermentation acids. The fennel tea with trisodium citrate dihydrate additive can also be categorized as tooth-preserving. That is to say, even a salt such as sodium citrate can neutralize the acids formed during fermentation in the oral cavity.

The inventive instant green tea beverage without buffering additives is categorized as borderline in the sector of tooth-preserving products. Only in the case of one curve determined did the pH fall for a short time to 5.6.

TABLE 1

Effect of inventive instant tea beverages on the pH of the interdental plaque measured by telemetry. The figures reported correspond to the lowest pHs of the subjects recorded during the control periods.

| Test pattern | A | | | | | | | | B | |
|---|---|---|---|---|---|---|---|---|---|---|
| Number of measurements | 8 | | | | | | | | 2 | |
| FIG. | 1 | 2 | 3 | 4 | 5 | 6 | 7 | 8 | 9 | 10 |
| Plaque age in days | 3 | 6 | 4 | 5 | 7 | 3 | 6 | 4 | 4 | 4 |
| pH: paraffin (start) | 6.90 | 7.00 | 7.00 | 6.95 | 7.00 | 7.00 | 7.00 | 6.95 | 7.05 | 6.85 |
| pH: fennel tea without additive | 6.05 | 5.65 | | | | | | | | 6.20 |
| pH: fennel tea with urea | | | | | 6.55 | 6.80 | | | 6.40 | |
| pH: green tea without additive | | | | | | | 5.95 | 5.60 | | |
| pH: fennel tea with trisodium citrate dihydrate | | 5.90 | 6.30 | | | | | | 5.95 | 6.25 |
| pH: 0.3 mol/l (10%) sucrose | 4.00 | 3.90 | 4.15 | 4.30 | 4.65 | 4.35 | 4.35 | 4.35 | 4.55 4.50 | 4.30 |
| pH: paraffin (end) | 5.95 | 6.30 | 6.20 | 6.40 | 6.00 | 6.35 | 6.50 | 6.65 | 6.55 | 6.00 |

The invention claimed is:

1. An instant beverage powder comprising ≧ 90% by weight, based on the total amount, of isomaltulose as carrier, ≦ 5% by weight, based on the total amount, of water, 0.1% by weight to 5% by weight, based on the total amount, of at least one of a plant extract and plant parts and 0.1% by weight to 5% by weight, based on the total amount, of urea or a derivative thereof as buffering additive.

2. The instant beverage powder as claimed in claim 1, where the extract is an extract of plant parts of the tea shrub.

3. The instant beverage powder as claimed in claim 1, where the extract is an extract of black tea.

4. The instant beverage powder as claimed in claim 1, where the instant beverage powder is an instant black tea powder.

5. The instant beverage powder as claimed in claim 1, where the extract is an extract of Oolong tea.

6. The instant beverage powder as claimed in claim 5, where the instant beverage powder is an instant Oolong tea powder.

7. The instant beverage powder as claimed in claim 1, where the extract is an extract of green tea.

8. The instant beverage powder as claimed in claim 7, where the instant beverage powder is an instant green tea powder.

9. The instant beverage powder as claimed in claim 1, where the extract additionally comprises natural or nature-identical aroma substances and/or taste substances.

10. The instant beverage powder as claimed in claim 1, where the extract is isolated from a tea to which, for aromatization, at least one of flavoring fruit juices, aroma-giving and taste-giving plants or plant parts, and flavoring potable spirits have been added.

11. The instant beverage powder as claimed in claim 9, where the instant beverage powder is an aromatized instant black tea powder, instant green tea powder or instant Oolong tea powder.

12. The instant beverage powder as claimed in claim 1, where the extract is isolated from plants or plant parts which do not come from the tea bush.

13. The instant beverage powder as claimed in claim 12, where the extract is isolated from aniseed, valerian root, stinging nettles, blackberry leaves, strawberry leaves, fennel, lady's mantel, silver weed, ginseng, rosehip, bilberry leaves, hibiscus blossoms, raspberry leaves, elder, hops, ginger, blackcurrant leaves, St. John's wort, chamomile, coriander, spearmint, Lapacho plant, lavender, lemon grass, linden blossoms, dandelion, marjoram, mallow, field eryngo, mate plant, lemon balm, mistletoe, peppermint, peony, marigold, rosemary, Rooibos, yarrow, plantain, thyme, verbena, hawthorn, hyssop, cinnamon and/or from parts thereof.

14. The instant beverage powder as claimed in claim 13, where the instant beverage powder is an instant herbal tea powder.

15. The instant beverage powder as claimed in claim 13, where the extract additionally comprises natural or nature-identical aroma substances or taste substances.

16. The instant beverage powder as claimed in claim 13, where the extract is isolated from plants or plant parts to which, for aromatization, flavoring fruit juices have been added.

17. The instant beverage powder as claimed in claim 15, where the instant beverage powder is an aromatized instant herbal tea powder.

18. The instant beverage powder as claimed in claim 1, where the instant beverage powder comprises an extract isolated from fruits.

19. The instant beverage powder as claimed in claim 18, where the extract is isolated from apples, pineapples, pears, oranges, grapefruit, limes, passion fruits, peaches, sea buckthorn berries and/or lemons.

20. The instant beverage powder comprising ≧ 90% by weight, based on the total amount, of isomaltulose as carrier ≦ 5% by weight, based on the total amount, of water, 0.1% by weight to 5% by weight, based on the total amount, of natural or nature-identical fruit flavorings and 0.1% by weight to 5% by weight, based on the total amount, of urea or a derivative thereof as buffering additive.

21. The instant beverage powder as claimed in claim 18, where the instant beverage powder is an instant fruit tea powder.

22. The instant beverage powder as claimed in claim 1, where the instant beverage powder comprises flow promoters.

23. The instant beverage powder as claimed in claim 22, where the flow promoter is silicon dioxide.

24. The instant beverage powder as claimed in claim 1, where the instant beverage powder comprises natural and/or synthetic colorings.

25. The instant beverage powder as claimed in claim 24, where the natural colorings are selected from the group consisting of a coloring of plant origin, a coloring of animal origin, an inorganic pigment, a product of enzymatic browning, a product of non-enzymatic browning and a carbohydrate heating product.

26. The instant beverage powder as claimed in claim 24, where the synthetic colorings are selected from the group consisting of an azo compound, a triphenylmethane compound, an indigoid compound, a xanthene compound and a quinoline compound.

27. The instant beverage powder as claimed in claim 1, where the instant beverage powder comprises natural or synthetic vitamins.

28. The instant beverage powder as claimed in claim 27, where the vitamins are selected from the group consisting of vitamin A, vitamin $B_1$, vitamin $B_2$, vitamin $B_3$, vitamin $B_5$, vitamin $B_6$, vitamin $B_{12}$, vitamin B complex, vitamin C, vitamin D, vitamin E, vitamin F and vitamin K.

29. The instant beverage powder as claimed in claim 1, where the instant beverage powder comprises minerals and trace elements.

30. The instant beverage powder as claimed in claim 1, where the instant beverage powder comprises at least one intense sweetener.

31. The instant beverage powder as claimed in claim 30, where the intense sweetener is selected from the group consisting of saccharin, saccharin Na, saccharin K, saccharin Ca, sodium cyclamate, calcium cyclamate, acesulfame K, aspartame, dulcine, stevioside and neohesperidine dihydrochalcone.

32. A method for producing isomaltulose-containing instant beverage powders which comprise, as a first component, $\geq$ 90% by weight, based on the total amount, of isomaltulose as carrier, as a second component, $\leq$ 5% by weight, based on the total amount, of water and, as a third component, either 0.1% by weight to 5% by weight, based on the total amount, of at least one of a plant extract and plant parts or, alternatively, 0.1% by weight to 5% by weight, based on the total amount, of natural or nature-identical fruit flavors, wherein the method further comprises the addition of urea or a derivative thereof to the beverage powder as a buffering additive.

33. The method as claimed in claim 32, where urea or the derivative thereof, on consumption of a beverage produced using the isomaltulose-containing instant beverage powders, prevents a lowering of the pH in the oral cavity to the acidic range.

34. The method as claimed in claim 32, wherein the urea or the derivative thereof reinforces the sweetening power of isomaltulose.

\* \* \* \* \*

UNITED STATES PATENT AND TRADEMARK OFFICE
CERTIFICATE OF CORRECTION

PATENT NO.         : 7,553,509 B2                                                Page 1 of 1
APPLICATION NO. : 10/521891
DATED              : June 30, 2009
INVENTOR(S)        : Dörr et al.

It is certified that error appears in the above-identified patent and that said Letters Patent is hereby corrected as shown below:

Title Page, Item (75), Correct the spelling of inventor Thomas Keme's city of residence from [[AARAN (CH)]] to --AARAU (CH)--;

Title Page,
Replace section (73) Assignee with:
(73) Assignee:   SÜDZUCKER AKTIENGESELLSCHAFT
                 MANNHEIM/OCHSENFURT,
                 Mannheim (DE)

Signed and Sealed this

First Day of September, 2009

David J. Kappos
*Director of the United States Patent and Trademark Office*